United States Patent
Tanba et al.

(10) Patent No.: US 9,747,326 B2
(45) Date of Patent: Aug. 29, 2017

(54) NON-TRANSITORY COMPUTER-READABLE RECORDING MEDIUM THAT STORES DOCUMENT EVALUATION PROGRAM THAT EVALUATES CONSISTENCY IN DOCUMENT

(71) Applicant: Kyocera Document Solutions Inc., Osaka (JP)

(72) Inventors: Masato Tanba, Osaka (JP); Yoshitaka Matsuki, Osaka (JP); Satoshi Kawakami, Osaka (JP); Yosuke Nakazato, Osaka (JP); Wataru Endo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 357 days.

(21) Appl. No.: 14/471,847

(22) Filed: Aug. 28, 2014

(65) Prior Publication Data
US 2015/0066868 A1 Mar. 5, 2015

(30) Foreign Application Priority Data

Aug. 30, 2013 (JP) ................................. 2013-180534

(51) Int. Cl.
*G06F 17/30* (2006.01)

(52) U.S. Cl.
CPC .. *G06F 17/30371* (2013.01); *G06F 17/30598* (2013.01); *G06F 17/30705* (2013.01); *G06F 17/30713* (2013.01)

(58) Field of Classification Search
CPC ......... G06F 17/30371; G06F 17/30598; G06F 17/30705; G06F 17/30713
USPC ........................................ 707/687, 690, 737
See application file for complete search history.

(56) References Cited

U.S. PATENT DOCUMENTS

| 6,567,545 B1 | 5/2003 | Kobara et al. | |
|---|---|---|---|
| 8,619,340 B2* | 12/2013 | Fan | G06K 9/3208 345/649 |
| 2002/0078098 A1* | 6/2002 | Shirai | G06F 17/3025 715/243 |
| 2002/0111966 A1* | 8/2002 | Fukuda | G06F 17/211 715/230 |
| 2007/0133067 A1* | 6/2007 | Garg | G06F 17/248 358/462 |

(Continued)

FOREIGN PATENT DOCUMENTS

| JP | 2005-050351 | 2/2005 |
|---|---|---|
| JP | 2006-050494 | 2/2006 |

(Continued)

*Primary Examiner* — Hares Jami
(74) *Attorney, Agent, or Firm* — K&L Gates LLP

(57) ABSTRACT

A non-transitory computer-readable recording medium that stores a document evaluation program executable by a computer in a document evaluation apparatus includes first program code that causes the computer to determine that a plurality of pages from each of which the same type of object has been detected are in the same group and to detect the plurality of pages in the same group from the document, second program code that causes the computer to evaluate consistency in the plurality of pages, in the same group, that have been detected by the first program code, and third program code that causes the computer to display an evaluation result obtained by the second program code.

6 Claims, 8 Drawing Sheets

(56) References Cited

U.S. PATENT DOCUMENTS

| | | | |
|---|---|---|---|
| 2009/0265363 A1* | 10/2009 | Lai | G06Q 10/10 |
| 2012/0036431 A1* | 2/2012 | Ito | G06F 17/2235 |
| | | | 715/273 |
| 2012/0330952 A1* | 12/2012 | Kong | G06F 17/30864 |
| | | | 707/737 |

FOREIGN PATENT DOCUMENTS

| | | |
|---|---|---|
| JP | 2007-316743 | 12/2007 |
| JP | 2008-252425 | 10/2008 |

* cited by examiner

NON-TRANSITORY COMPUTER-READABLE RECORDING MEDIUM THAT STORES DOCUMENT EVALUATION PROGRAM THAT EVALUATES CONSISTENCY IN DOCUMENT

REFERENCE TO RELATED APPLICATION

This application is based upon and claims the benefit of priority from the corresponding Japanese Patent Application No. 2013-180534, filed in the Japan Patent Office on Aug. 30, 2013, the entire contents of which are incorporated herein by reference.

FIELD

The present disclosure relates to a non-transitory computer-readable recording medium that stores a document evaluation program that can evaluate consistency in a document.

BACKGROUND

A typical color conversion method converts the colors of all objects included in each page of a document to a single color that provides a feel of consistency to improve the visibility of the objects.

In the typical color conversion method, even if pages in a plurality of different groups are included in a document, the colors of all objects included in each page of the document to a single color that provides a feel of consistency. This makes it hard to differentiate pages in the document for each group, so the content of the document may become difficult for the user to understand.

SUMMARY

A non-transitory computer-readable recording medium in an embodiment of the present disclosure stores a document evaluation program that is executable by a computer in a document evaluation apparatus. The document evaluation program includes first to fourth program codes. The first program code causes the computer to determine that a plurality of pages from each of which the same type of object has been detected are in the same group. The second program code causes the computer to detect the plurality of pages in the same group from the document. The third program code causes the computer to evaluate the consistency in the plurality of pages, in the same group, that have been detected by the second program code. The fourth program code causes the computer to display an evaluation result obtained by the third program code.

A document evaluation apparatus in an embodiment of the present disclosure includes a same-group page detecting unit, a consistency evaluation unit, and an evaluation display unit. The same-group page detecting unit determines that a plurality of pages from each of which the same type of object has been detected are in the same group and detects the plurality of pages in the same group from the document. The consistency evaluation unit evaluates the consistency in the plurality of pages, in the same group, that have been detected by the same-group page detecting unit. The evaluation display unit displays an evaluation result obtained by the consistency evaluation unit.

A document evaluation method in an embodiment of the present disclosure includes: (i) determining, via a same-group page detecting unit, that a plurality of pages from each of which the same type of object has been detected are in the same group; (ii) detecting, via the same-group page detecting unit, the plurality of pages in the same group from the document; (iii) evaluating, via a consistency evaluation unit, the consistency in the plurality of pages, in the same group, that have been detected by the same-group page detecting unit; and (iv) displaying, via an evaluation display unit, an evaluation result obtained by the consistency evaluation unit.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Embodiments of the present disclosure will be described with reference to the drawings.

First, an embodiment of the structure of a document evaluation apparatus 10 will be described.

Figure 1:
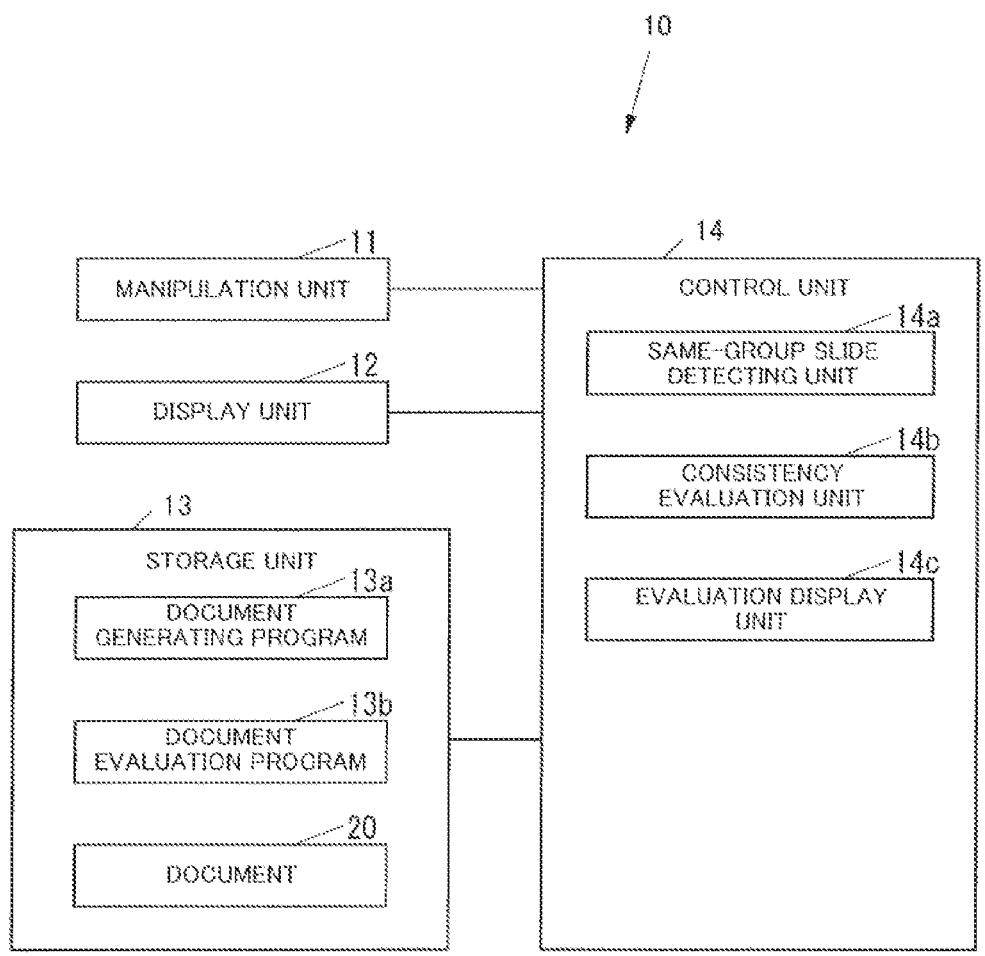
FIG. 1 illustrates a structure of a document evaluation apparatus in an embodiment of the present disclosure.

FIG. 1 illustrates an embodiment of the structure of the document evaluation apparatus 10 of the present disclosure.

As illustrated in FIG. 1, the document evaluation apparatus 10 includes a manipulation unit 11, a display unit 12, a storage unit 13, and a control unit 14. The manipulation unit 11 is a mouse, a keyboard, or another input device that accepts various manipulations. The display unit 12 is a liquid crystal display (LCD) or other device on which various information items are displayed. The storage unit 13 is a hard disk drive (HDD) or other non-volatile memory that stores programs and various types of data. The control unit 14 is a device that controls the whole of the document evaluation apparatus 10. The document evaluation apparatus 10 is formed with a personal computer (PC) or another type of computer.

The storage unit 13 can store a document 20 generated by the control unit 14.

Figure 2:
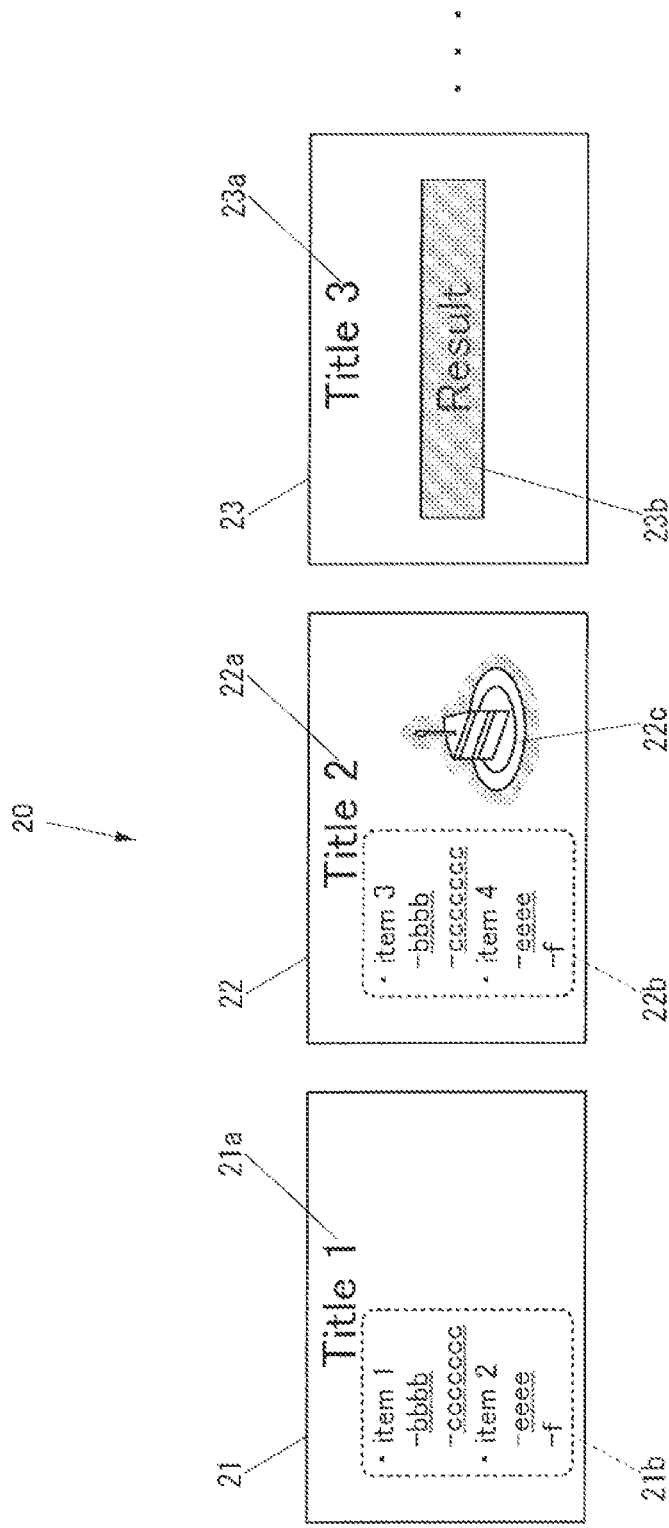
FIG. 2 illustrates an example of the document in FIG. 1.

FIG. 2 illustrates an example of a document 20.

As illustrated in FIG. 2, the document 20 can include a plurality of slides as pages. For example, the document 20 can include slides 21-23. Slide 21 includes an object 21*a* and an object 21*b*. Slide 22 includes an object 22*a*, an object 22*b*, and an object 22*c*. Slide 23 includes an object 23*a* and an object 23*b*. The objects 21*a*, 21*b*, 22*a*, 22*b*, 23*a*, and 23*b* are each a text object. The object 22*c* is an image object.

Various documents are generated as the document 20 according to the purpose. An example of the document 20 is a presentation document that is used in a presentation.

As illustrated in FIG. 1, the storage unit 13 stores a document generating program 13*a* that generates the document 20, a document evaluation program 13*b* that evaluates the document 20, besides the document 20. The document generating program 13*a* and document evaluation program 13*b* may be installed in the document evaluation apparatus 10 in advance in the process of manufacturing the document evaluation apparatus 10. Alternatively, they may be additionally installed in the document evaluation apparatus 10 through a network or from a compact disk (CD), a digital versatile disk (DVD), or another storage medium.

The control unit 14 includes, for example, a central processing unit (CPU), a read-only memory (ROM) in which programs and various types of data have been stored, and a random-access memory (RAM) used by the CPU as a working area. The CPU executes programs stored in the ROM or storage unit 13.

The control unit 14 functions as a same-group slide detecting unit 14*a*, a consistency evaluation unit 14*b*, and an evaluation display unit 14*c* by executing the document evaluation program 13*b* stored in the storage unit 13. The same-group slide detecting unit 14*a* detects a plurality of same-group slides from the document 20. The consistency evaluation unit 14*b* evaluates the plurality of same-group slides detected by the same-group slide detecting unit 14*a*. The evaluation display unit 14*c* displays an evaluation result on the display unit 12.

Next, the operation of the document evaluation apparatus 10 will be described.

First, the operation of the document evaluation apparatus 10 to generate the document 20 will be described.

The control unit 14 in the document evaluation apparatus 10 executes the document generating program 13*a* stored in the storage unit 13 to generate the document 20 according to the manipulation accepted through the manipulation unit 11.

Next, the operation of the document evaluation apparatus 10 to evaluate the document 20 will be described.

The control unit 14 in the document evaluation apparatus 10 executes the document evaluation program 13*b* stored in the storage unit 13 to make three evaluations: an evaluation of the consistency in slides in the document 20; an evaluation of an object impression degree that indicates the intensity of impression of an object; and an evaluation of a slide impression degree that indicates the intensity of impression of a slide.

First, the operation of the document evaluation apparatus 10 to evaluate the consistency in slides in the document 20 will be described.

Figure 3:
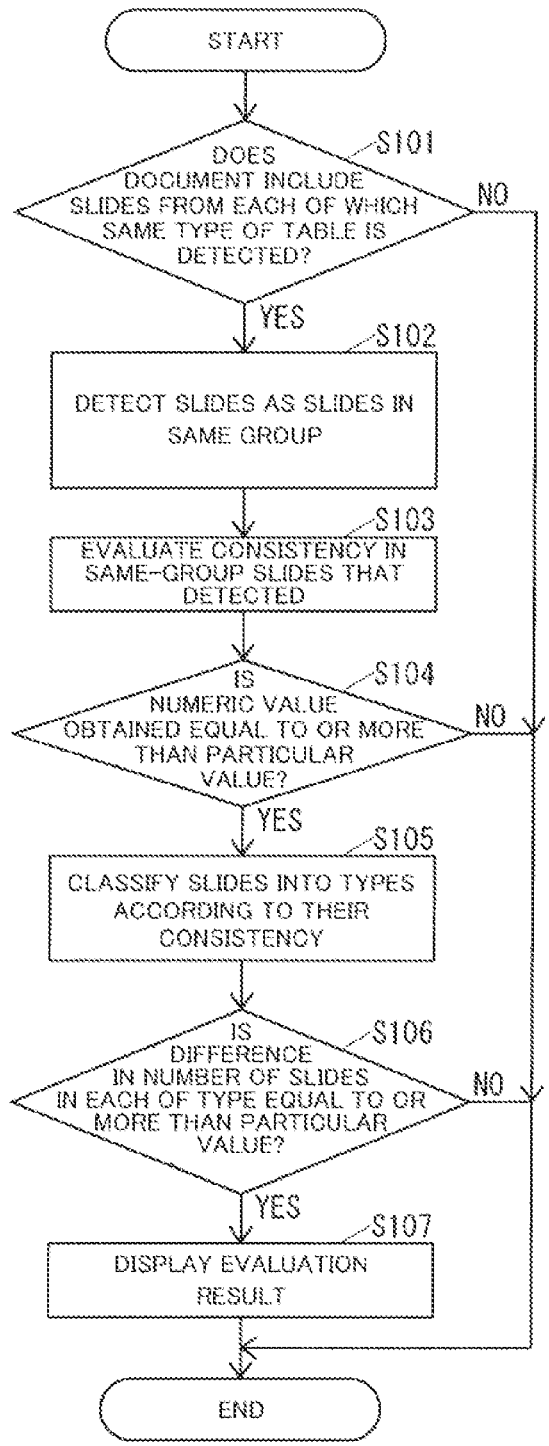
FIG. 3 illustrates an embodiment of the steps of processing to evaluate the consistency in slides in the document.

The control unit 14 operates as illustrated in FIG. 3 according to the manipulation accepted through the manipulation unit 11.

FIG. 3 illustrates an embodiment of the steps of processing to evaluate the consistency in slides in the document 20.

As illustrated in FIG. 3, the same-group slide detecting unit 14*a* determines whether the document 20 includes a plurality of slides from each of which the same type of table is detected (S101). If the plurality of tables has the same title, the same-group slide detecting unit 14*a* determines that these tables are of the same type.

If the same-group slide detecting unit 14*a* determines in S101 that the target document 20 does not include a plurality of slides from each of which the same type of table is detected, the same-group slide detecting unit 14*a* terminates the operation in FIG. 3.

If the same-group slide detecting unit 14*a* determines in S101 that the target document 20 includes a plurality of slides from each of which the same type of table is detected, the same-group slide detecting unit 14*a* detects the plurality of slides as slides in the same group (S102).

Next, the consistency evaluation unit 14*b* evaluates the consistency in the plurality of same-group slides that detected in S102 (S103).

For example, from the viewpoint of the position of the same type of table included in each of the plurality of slides in the same group that have been detected in S102, the position being on the relevant slide, the consistency evaluation unit 14*b* evaluates the consistency in these slides in S103. Specifically, the consistency evaluation unit 14*b* converts the difference in the position of the same type of table into a numeric value for each of the plurality of slides in the same group, the position being on the relevant slide, according to a particular rule, and uses the numeric value as a value to be added in numeric evaluation of the consistency in these slides.

Also, from the viewpoint of the size of the same type of table included in each of the plurality of slides in the same group that have been detected in S102, the consistency evaluation unit 14*b* evaluates the consistency in these slides in S103. Specifically, the consistency evaluation unit 14*b* converts the difference in the size of the same type of table into a numeric value for each of the plurality of slides in the same group according to a particular rule, and uses the numeric value as a value to be added in numeric evaluation of the consistency in these slides.

Also, from the viewpoint of the color of the same type of table included in each of the plurality of slides in the same group that have been detected in S102, the consistency evaluation unit 14*b* evaluates the consistency in these slides in S103. Specifically, the consistency evaluation unit 14*b* converts the difference in the color of the same type of table into a numeric value for each of the plurality of slides in the same group according to a particular rule, and uses the numeric value as a value to be added in numeric evaluation of the consistency in these slides.

Also, from the viewpoint of the background color of each of the plurality of slides in the same group that have been detected in S102, the consistency evaluation unit 14*b* evaluates the consistency in these slides in S103. Specifically, the consistency evaluation unit 14*b* converts the difference in the background color into a numeric value for each of the plurality of slides in the same group according to a particular rule, and uses the numeric value as a value to be added in numeric evaluation of the consistency in these slides.

From various viewpoints as described above, the consistency evaluation unit 14b uses numeric values to comprehensively evaluate the consistency in a plurality of slides in the same group. Specifically, the consistency evaluation unit 14b totals the above values to be added to numerically evaluate the consistency in a plurality of slides in the same group.

Upon completion of the step in S103, the evaluation display unit 14c determines whether the numeric value obtained in the comprehensive evaluation in S103 is equal to or more than a particular value (S104).

If the evaluation display unit 14c determines in S104 that the obtained numeric value is smaller than the particular value, the evaluation display unit 14c terminates the operation in FIG. 3.

If the evaluation display unit 14c determines in S104 that the obtained numeric value is equal to or more than the particular value, the evaluation display unit 14c classifies the plurality of slides in the same group that have been detected in S102, into a plurality of types according to their consistency (S105). For example, from a plurality of viewpoints of the position, size, and color of the same type of table included in each of the plurality of slides in the same group that have been detected in S102, the position being on the relevant slide, as well as the background color of each of these slides, the evaluation display unit 14c classifies the plurality of slides in the same group into a plurality of types according to their consistency.

Next, the evaluation display unit 14c determines, for each of the plurality of viewpoints, whether a difference in the number of slides in each of the plurality of types into which the plurality of slides have been classified in S105 is equal to or more than a particular value (S106).

If the evaluation display unit 14c determines in S106 that the difference is smaller than the particular value for all of the plurality of viewpoints, the evaluation display unit 14c terminates the operation in FIG. 3.

If the evaluation display unit 14c determines in S106 that the difference is equal to or more than the particular value for at least any one of the plurality of viewpoints, the evaluation display unit 14c displays the evaluation result obtained in S103 on the display unit 12 for each viewpoint in which a difference in the number of slides in each of the plurality of types into which the plurality of slides have been classified in S105 is equal to or more than the particular value (S107) and terminates the operation in FIG. 3.

Figure 4:
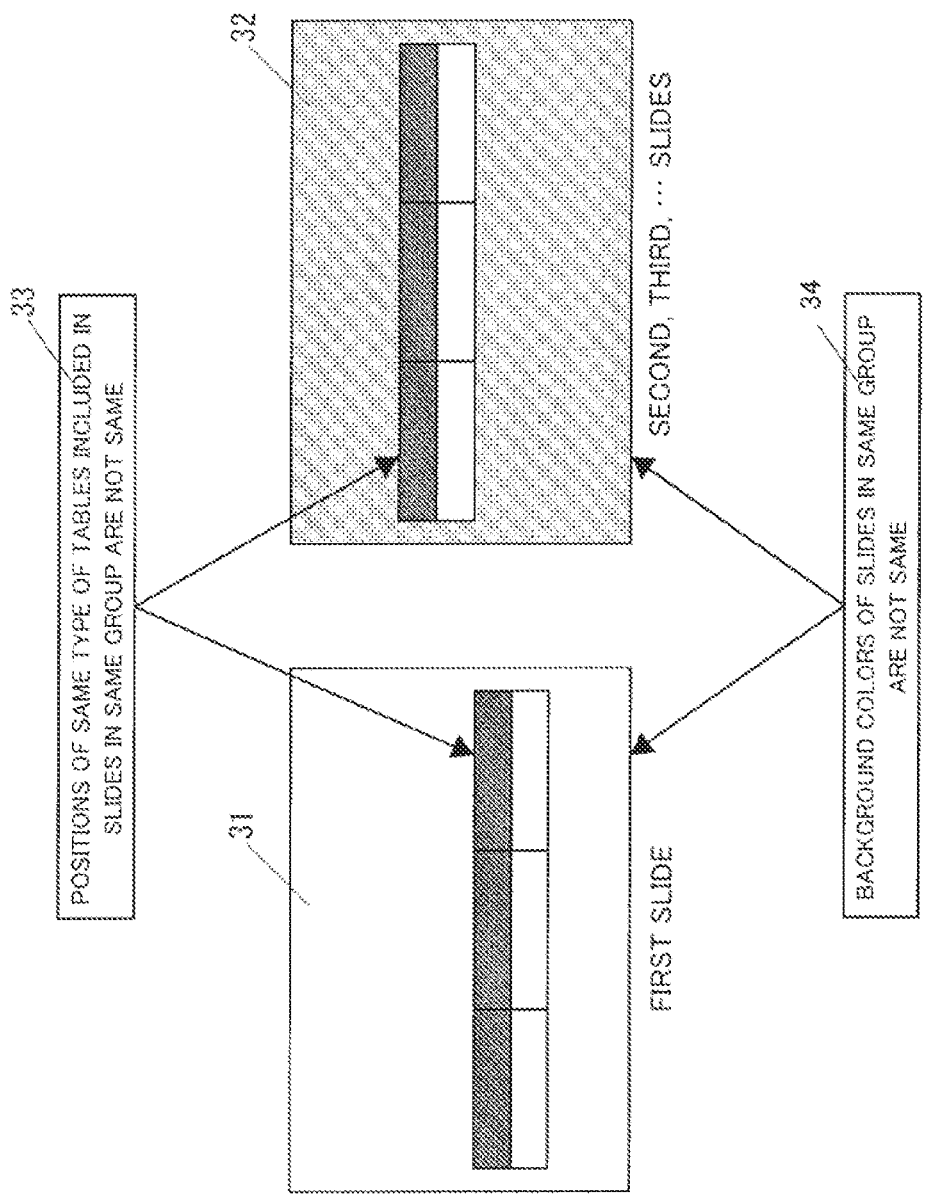
FIG. 4 illustrates an example of a consistency evaluation result displayed on the display unit in FIG. 1.

FIG. 4 illustrates an example of a consistency evaluation result displayed on the display unit 12.

The evaluation result in FIG. 4 is a result for a document 20 different from the document 20 in FIG. 2. In the evaluation result in FIG. 4, an image 31 drawn above the text "FIRST SLIDE" schematically illustrates a first slide of the document 20. An image 32 drawn above the text "SECOND, THIRD, . . . SLIDE" schematically illustrates second, third, and later slides of the document 20. The image 31 indicates a slide the type of which is such that the number of slides of the type is small, that is, a minority-type slide, the type being one of the plurality of types into which the plurality of types into which the plurality of slides have been classified in S105. The image 32 indicates a slide the type of which is such that the number of slides of the type is large, that is, a majority-type slide, the type being one of the plurality of types into which the plurality of types into which the plurality of slides have been classified in S105.

A message 33 indicates that the positions of the same type of tables included in a plurality of slides in the same group are not the same, the positions being on the relevant slides. A message 34 indicates that the background colors of a plurality of slides in the same group are not the same.

Next, operation of the document evaluation apparatus 10 to evaluate the object impression degree will be described.

Figure 5:
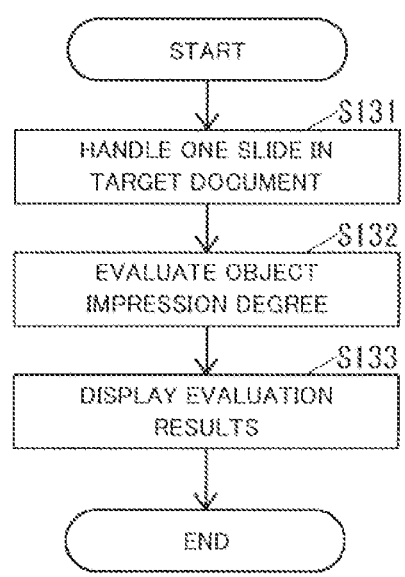
FIG. 5 illustrates an embodiment of the steps of processing to evaluate an object impression degree.

The control unit 14 operates as illustrated in FIG. 5 according to the manipulation accepted through the manipulation unit 11.

FIG. 5 illustrates an embodiment of the steps of processing to evaluate the object impression degree.

As illustrated in FIG. 5, the control unit 14 handles one slide in the target document 20 (S131).

Next, the control unit 14 evaluates the object impression degree for each of all objects included in the target slide (S132).

In S132, the control unit 14 evaluates the object impression degree according to, for example, the type of the object such as an image or a text. Specifically, the control unit 14 converts the type of the object into a numeric value according to a particular rule, and uses the numeric value as a value to be added to the object impression degree. For example, the control unit 14 provides a higher object impression degree to an image object than to a text object.

In S132, the control unit 14 also evaluates the object impression degree according to the position, on the slide, of the object. Specifically, the control unit 14 converts the position, on the slide, of the object into a numeric value according to a particular rule, and uses the numeric value as a value to be added to the object impression degree. For example, the control unit 14 gives a higher object impression degree to an object located at an upper position on the slide or located closer to the center in the right and left direction.

In S132, the control unit 14 also evaluates the object impression degree according to the size of the object. Specifically, the control unit 14 converts the size of the object into a numeric value according to a particular rule, and uses the numeric value as a value to be added to the object impression degree. For example, the control unit 14 provides a higher object impression degree to a larger object.

In S132, the control unit 14 also evaluates the object impression degree according to the value of the difference between the color of the object and the background color of the slide. Specifically, the control unit 14 converts the value of the difference between the color of the object and the background color of the slide into a numeric value according to a particular rule, and uses the numeric value as a value to be added to the object impression degree. For example, the control unit 14 provides a higher object impression degree to the object as the value of a difference between the color of the object and the background color of the slide becomes larger.

In S132, the control unit 14 also evaluates the object impression degree according to the value of the difference between the colors of objects included in the target slide. Specifically, the control unit 14 converts the value of a difference between the colors of objects included in the target slide into a numeric value according to a particular rule, and uses the numeric value as a value to be added to the object impression degree. For example, the control unit 14 provides a higher object impression degree to objects included in the target slide as the value of the difference between the colors of these objects becomes larger. Of these objects, the control unit 14 may provide a higher object impression degree only to an object that has a larger difference in color between the object and the background of the slide.

In S132, the control unit 14 also evaluates the object impression degree of a text object according to the character size of the text. Specifically, the control unit 14 converts the character size of the text according to a particular rule, and uses the numeric value as a value to be added to the object impression degree. For example, the control unit 14 provides a higher object impression degree to the text object as the character size of the text becomes larger.

In S132, the control unit 14 also evaluates the object impression degree of a text object according to the number of characters included in the text. Specifically, the control unit 14 converts the number of characters included in the text according to a particular rule, and uses the numeric value as a value to be added to the object impression degree. For example, the control unit 14 provides a higher object impression degree to the text object as the number of characters included in the text becomes smaller.

From various viewpoints as described above, the control unit 14 uses a numeric value to comprehensively evaluate the object impression degree for each object included in the target slide. Specifically, the control unit 14 totals the above values to be added to the object impression degree to numerically evaluate the object impression degree for each object included in the target slide.

Next, the evaluation display unit 14c displays the evaluation results obtained in S132 on the display unit 12 (S133) and terminates the operation in FIG. 5.

Figure 6:
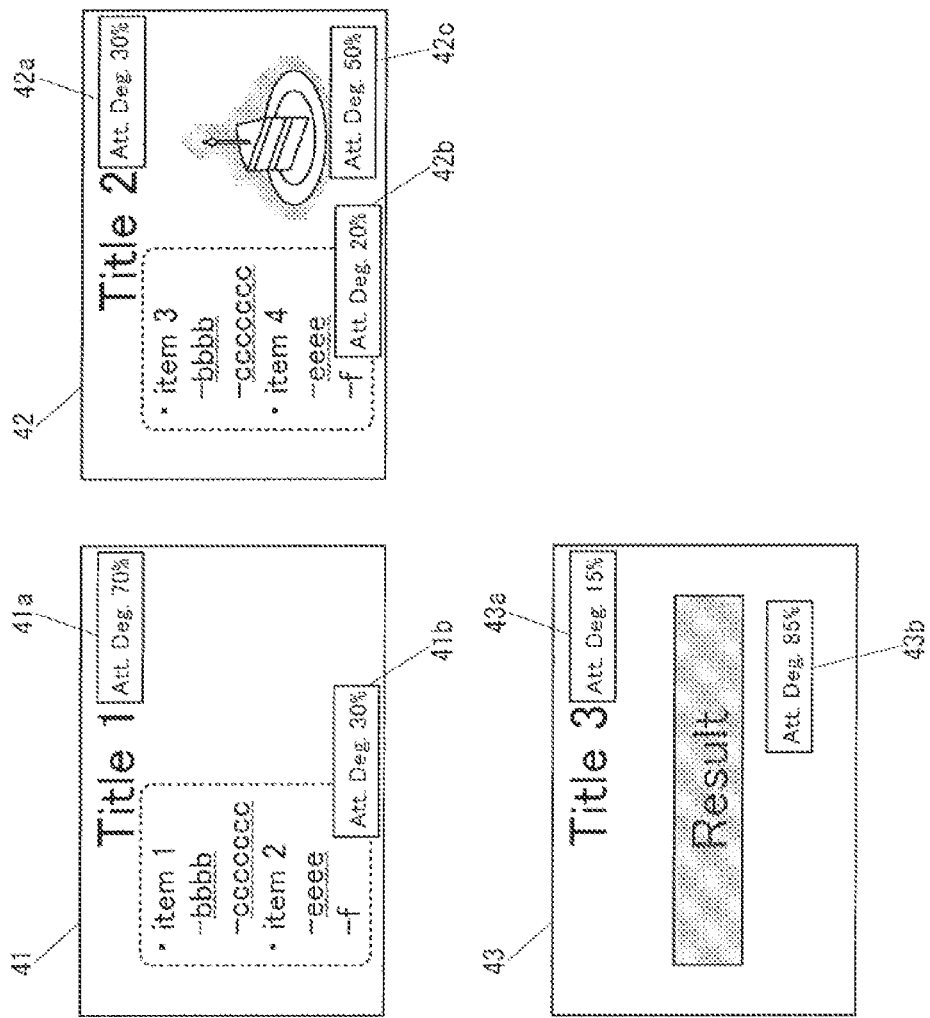
FIG. 6 illustrates examples of evaluation results of the object impression degree that are displayed on the display unit in FIG. 1.

FIG. 6 illustrates examples of evaluation results of the object impression degree that are displayed on the display unit 12.

In the evaluation results in FIG. 6, an image 41 indicates the slide 21 (see FIG. 2). A message 41a indicates the object impression degree of the object 21a (see FIG. 2) as an attention degree of 70%. A message 41b indicates the object impression degree of the object 21b (see FIG. 2) as an attention degree of 30%.

An image 42 indicates the slide 22 (see FIG. 2). A message 42a indicates the object impression degree of the object 22a (see FIG. 2) as an attention degree of 30%. A message 42b indicates the object impression degree of the object 22b (see FIG. 2) as an attention degree of 20%. A message 42c indicates the object impression degree of the object 22c (see FIG. 2) as an attention degree of 50%.

An image 43 indicates the slide 23 (see FIG. 2). A message 43a indicates the object impression degree of the object 23a (see FIG. 2) as an attention degree of 15%. A message 43b indicates the object impression degree of the object 23b (see FIG. 2) as an attention degree of 85%.

In each evaluation result in FIG. 6, the values of the object impressing degree of the objects included in each slide are each represented as a percentage so that their total becomes 100%. If, however, a correlation can be represented in the intensity of impression of all objects included in one slide, the evaluation result may not be represented as a percentage. For example, the values of the object impressing degree obtained in S132 may be used without alteration.

In FIG. 6, the valuation results of three slides are simultaneously displayed on the display unit 12. However, the number of slides for which evaluation results are displayed on the display unit 12 is not limited to 3. For example, an evaluation result of one slide may be displayed at a time.

Next, the operation of the document evaluation apparatus 10 to evaluate the slide impression degree will be described.

Figure 7:
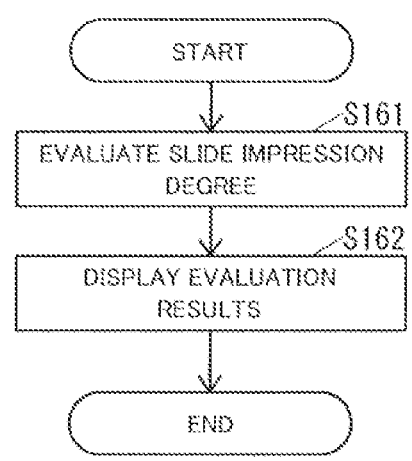
FIG. 7 illustrates an embodiment of the steps of processing to evaluate a slide impression degree.

The control unit 14 operates according to the manipulation accepted through the manipulation unit 11 as illustrated in FIG. 7.

FIG. 7 illustrates an embodiment of the steps of processing to evaluate the slide impression degree.

As illustrated in FIG. 7, the control unit 14 evaluates the slide impression degree for each of all slides included in the target document 20 (S161).

In S161, the control unit 14 evaluates the slide impression degree according to, for example, the degree of the difference in the target slide from the tendency of the appearance of all slides in the document 20. Specifically, the control unit 14 converts the degree of the difference in the target slide from the tendency of the appearance of all slides in the document 20 into a numeric value according to a particular rule, and uses the numeric value as the value to be added to the slide impression degree. For example, the control unit 14 provides a higher slide impression degree to the target slide as the degree of a difference in the target slide from the tendency of the appearance of all slides in the document 20 becomes larger.

In particular, in S161, the control unit 14 may evaluate the slide impression degree according to the degree of the difference in the target slide from the tendency of the appearance of all slides in the document 20 and to the maximum value of the object impression degree of the target slide. Specifically, the control unit 14 may convert the degree of the difference in the target slide from the tendency of the appearance of all slides in the document 20 into a numeric value according to a particular rule and uses the numeric value as the value to be added to the slide impression degree, and also may convert the maximum value of the object impression degree of the target slide into the numeric value according to a particular rule and uses the numeric value as the value to be added to the slide impression degree. For example, the control unit 14 provides a higher slide impression value to the target slide as the degree of the difference in the target slide from the tendency of the appearance of all slides in the document 20 becomes larger and the maximum value of the object impression degree of the target slide becomes larger.

The tendency of the appearance of all slides in the document 20 can be determined from, for example, the ratio of type-specific objects on the slide. The ratio of type-specific objects on the slide indicates, for example, the ratio of the number of text objects on the slide to the total of the number of image object on the slide and the number of tabular objects on the slide.

The tendency of the appearance of all slides in the document 20 can also be determined from, for example, the use of colors on the slide.

The tendency of the appearance of all slides in the document 20 can also be determined from, for example, the placement of the objects on the slide.

In S161, the control unit 14 also evaluates the slide impression degree according to the degree of simplicity of the appearance of the slide. Specifically, the control unit 14 converts the degree of simplicity of the appearance of the slide to a numeric value according to a particular rule, and uses the numeric value as the value to be added to the slide impression degree. For example, the control unit 14 provides a higher slide impression degree as the degree of the simplicity of the appearance of the slide becomes higher.

The degree of simplicity of the appearance of the slide can be determined from, for example, the number of objects included on the slide. That is, the smaller the number of objects included on the slide is, the higher the simplicity of the appearance of the slide.

The degree of simplicity of the appearance of the slide can also be determined from, for example, the number of characters in all texts included on the slide as objects. That is, the smaller the number of characters in all texts included on the slide as objects is, the higher the simplicity of the appearance of the slide is.

The degree of simplicity of the appearance of the slide can also be determined from, for example, the placement of the objects on the slide. That is, a slide on which the placement of the objects is bilaterally symmetrical has a higher degree of simplicity of the appearance than a slide on which the placement of the objects is not bilaterally symmetrical. A slide on which an image object is placed at the center has a higher degree of simplicity of the appearance than a slide on which an image object is placed at other than the center. A slide on which a plurality of image objects are placed at regular positions has a higher degree of simplicity of the appearance than a slide on which a plurality of image objects are placed at irregular positions.

In S161, the control unit 14 also evaluates the slide impression degree according to the degree of showiness of a color on the slide. Specifically, the control unit 14 converts the degree of showiness of the color on the slide to a numeric value according to a particular rule, and uses the numeric value as a value to be added to the slide impression degree. For example, the control unit 14 provides a higher slide impression degree as the degree of the showiness of the color on the slide becomes higher.

The degree of showiness of the color on the slide can be determined from, for example, at least one of the chroma and brightness of the color of an object included on the slide. Specifically, the higher the chroma of the color of an object included on the slide, the higher the degree of showiness of the color on the slide, and the higher the brightness of the color of an object included on the slide, the higher the degree of showiness of the color on the slide.

The degree of showiness of the color on the slide can also be determined from, for example, at least one of the chroma and brightness of the color of the background of the slide. Specifically, the higher the chroma of the color of the background of the slide, the higher the degree of showiness of the color on the slide, and the higher the brightness of the color of the background of the slide, the higher the degree of showiness of the color on the slide.

From various viewpoints as described above, the control unit 14 uses numeric values to comprehensively evaluate the slide impression degree for each slide included in the target document 20. Specifically, the control unit 14 totals the above values to be added to numerically evaluate the slide impression degree for each slide included in the target document 20.

Next, the evaluation display unit 14c displays the evaluation results obtained in S161 on the display unit 12 (S162) and terminates the operation in FIG. 7.

Figure 8:
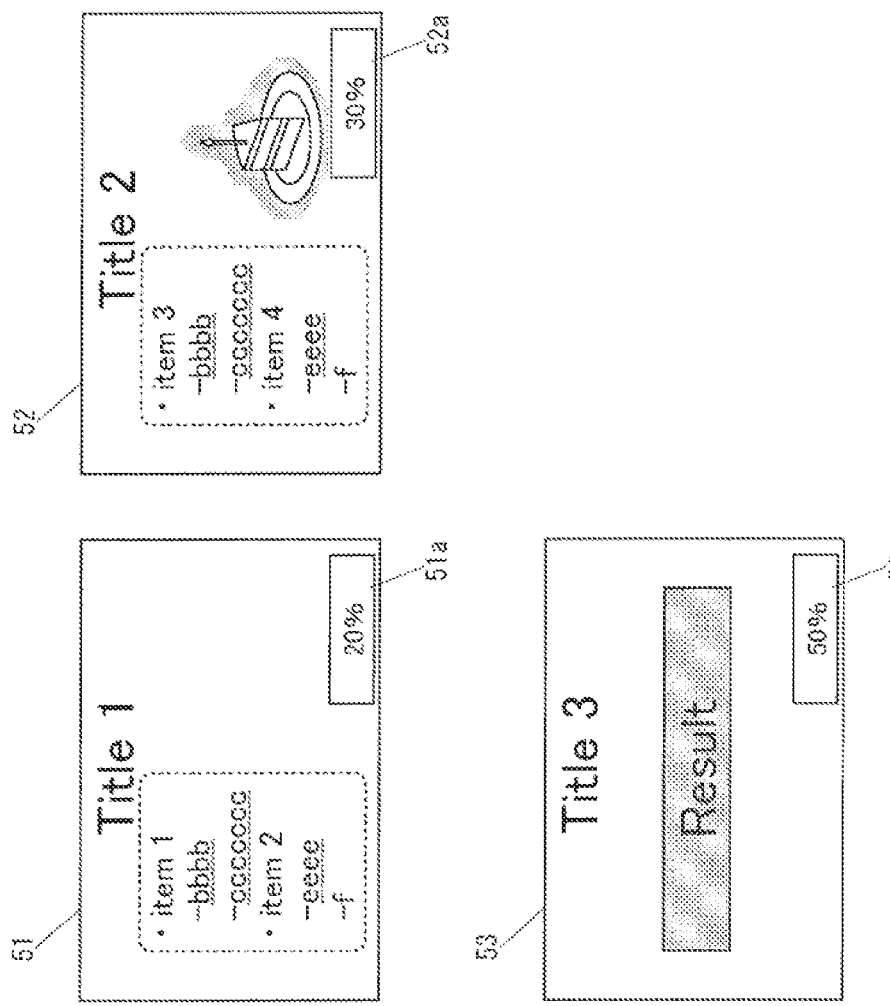
FIG. 8 illustrates examples of evaluation results of the slide impression degree that are displayed on the display unit in FIG. 1.

FIG. 8 illustrates examples of evaluation results of the slide impression degree that are displayed on the display unit 12.

In the evaluation results in FIG. 8, an image 51 indicates the slide 21 (see FIG. 2). A message 51a indicates the slide impression degree (20%) of the slide 21.

An image 52 indicates the slide 22 (see FIG. 2). A message 52a indicates the slide impression degree (30%) of the slide 22.

An image 53 indicates the slide 23 (see FIG. 2). A message 53a indicates the slide impression degree (50%) of the slide 23.

In each evaluation result in FIG. 8, the values of the slide impressing degree of all slides included in the document 20 are each represented as a percentage so that their total becomes 100%. If, however, a correlation can be represented in the intensity of impression of all slides included in the document 20, the evaluation result may not be represented as a percentage. For example, the values of the slide impressing degree obtained in S161 may be used without alteration.

In FIG. 8, the valuation results of three slides are simultaneously displayed on the display unit 12. However, the number of slides for which evaluation results are displayed on the display unit 12 is not limited to 3. For example, an evaluation result of one slide may be displayed at a time.

As described above, when the document evaluation apparatus 10 determines that the document 20 includes a plurality of slides from each of which the same type of table has been detected (the result in S101 is Yes), the document evaluation apparatus 10 determines that these slides are in the same group and detects the slides in the same group from the document 20 (S102). The document evaluation apparatus 10 then displays an evaluation result for consistency in the slides included in the document 20 (S107). This enables the user to easily recognize an evaluation result for consistency in slides for each group of slides.

If slides in the same group in the document 20 have a feel of consistency, the user can comfortably view the document 20 and, as a result, can check the content of the document 20 in a concentrated manner. Therefore, a person responsible for generating the document 20 wants to generate the document 20 so that slides in the same group have a feel of consistency. The document evaluation apparatus 10 enables the person responsible for generating the document 20 to recognize an objective evaluation result for consistency in slides in the same group. Therefore, when the person responsible for generating the document 20 confirms the objective evaluation result that is displayed for consistency in slides in the same group by the document evaluation apparatus 10, the person can appropriately correct the document 20 in a short time.

An example of the document 20 that includes a plurality of slides in the same group is a document 20 that reports investigation results.

The document evaluation apparatus 10 evaluates consistency in slides from the viewpoint of at least one of the position of the same type of table included in each of the plurality of slides in the same group that have been detected in S102, the position being on the relevant slide, the size of the same type of table included in each of the plurality of slides in the same group that have been detected in S102, the color of the same type of table included in each of the plurality of slides in the same group that have been detected in S102, and the background color of each of the plurality of slides in the same group that have been detected in S102 (S103). Therefore, it is possible for the user to recognize an evaluation result for consistency in slides.

The document evaluation apparatus 10 may evaluate consistency in these slides from another viewpoint.

Although, in an embodiment, the document evaluation apparatus 10 comprehensively evaluates consistency in a plurality of slides in the same group from a plurality of viewpoints of the position of the same type of table included in each of the plurality of slides in the same group, the position being on the relevant slide, the size of the same type of table included in each of the plurality of slides in the same group, the color of the same type of table included in each of the plurality of slides in the same group, and the background color of each of the plurality of slides in the same group, this is not a limitation; the document evaluation apparatus 10 may evaluate consistency in these slides for each of these viewpoints.

When the plurality of slides in the same group can be further classified into a plurality of sub-types according to consistency in these slides, if a difference in the number of slides in each of the plurality of sub-types is equal to or more than a particular value, it is highly likely that the user has unintentionally lost consistency from minority-type slides of the slides of the plurality of sub-types. If a difference in the number of slides in each of the plurality of sub-types is smaller than the particular value, it is highly likely that the user has intentionally lost consistency from minority-type slides of the slides of the plurality of sub-types. If a difference in the number of slides in each of the plurality of sub-types is equal to or more than the particular value (the result in S106 is Yes), the document evaluation apparatus 10 displays an evaluation result for consistency in slides (S107). This enables the user to appropriately recognize an evaluation result for consistency in slides.

If the document evaluation apparatus 10 determines in S104 that the numeric value obtained in the comprehensive evaluation in S103 is equal to or more than the particular value, the document evaluation apparatus 10 may execute step in S107 without executing step in S105 and S106.

Since the document evaluation apparatus 10 determines that a plurality of slides each of which includes a table with different values from other tables, but with the same title are in the same group, it is possible for the user to recognize an evaluation result for consistency in slides for each appropriate group of slides included in the document 20.

When determining that a plurality of slides is in the same group, the document evaluation apparatus 10 may use a condition other than the condition that the title of the table matches.

When determining that a plurality of slides from each of which the same type of object has been detected are in the same group, the document evaluation apparatus 10 may use a non-tabular object as a target to be detected as the same type of object. For example, the document evaluation apparatus 10 may determine that a plurality of slides from each of which the same type of image object has been detected are in the same group. Alternatively, the document evaluation apparatus 10 may determine that a plurality of slides from each of which the same type of text object has been detected are in the same group.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A non-transitory computer-readable recording medium that stores a document evaluation program executable by a computer in a document evaluation apparatus, the document evaluation program comprises:
    a first program code that causes the computer to determine that a plurality of slides from each of which the same type of object has been detected are in the same group;
    a second program code that causes the computer to detect the plurality of slides in the same group from a document;
    a third program code that causes the computer to evaluate consistency in the plurality of slides, in the same group, that have been detected by the second program code;
    a fourth program code that causes the computer to classify, if a numeric value obtained for evaluating the consistency is equal to or more than a particular value, the plurality of slides in the same group into a plurality of types according to the consistency in the plurality of slides; and
    a fifth program code that causes the computer to display, when a difference in a number of slides in each of the plurality of types classified by the fourth program is equal to or more than a particular value, an evaluation result obtained by the third program code,
    wherein the third program code causes the computer to evaluate the consistency in the plurality of slides in the same group based on the numeric value that is obtained by at least one of adding a first difference in a position of the same type of object included in each of the plurality of slides in the same group, the position being on each of the plurality of slides, adding a second difference in a size of the same type of object included in each of the plurality of slides in the same group, adding a third difference in a color of the same type of object included in each of the plurality of slides in the same group, and adding a fourth difference in a background color of each of the plurality of slides in the same group.

2. The non-transitory computer-readable recording medium according to claim 1, the document evaluation program comprises:
    a sixth program code that causes the computer to determine that a plurality of tables having the same title are of the same type; and
    the third program code causes the computer to determine that the plurality of slides from each of which the same type of table has been detected as the same type of object are in the same group.

3. A document evaluation apparatus, comprising:
    a memory that stores a document evaluation program; and
    a processor that executes the document evaluation program, wherein when the processor executes the document evaluation program, the processor operates as:
    a same-group page detecting unit that determines that a plurality of slides from each of which the same type of object has been detected are in the same group and detects the plurality of slides in the same group from a document;
    a consistency evaluation unit that evaluates consistency in the plurality of slides, in the same group, that have been detected by the same-group page detecting unit; and
    an evaluation display unit that
        classifies, if a numeric value obtained for evaluating the consistency is equal to or more than a particular value, the plurality of slides in the same group into a plurality of types according to the consistency in the plurality of slides, and
        displays, when a difference in a number of slides in each of the plurality of types that is classified is equal to or more than a particular value, an evaluation result obtained by the consistency evaluation unit,
    wherein the consistency evaluation unit evaluates the consistency in the plurality of slides in the same group based on the numeric value that is obtained by at least one of adding a first difference in a position of the same type of object included in each of the plurality of slides in the same group, the position being on each of the plurality of slides, adding a second difference in a size of the same type of object included in each of the plurality of slides in the same group, adding a third difference in a color of the same type of object included in each of the plurality of slides in the same group, and adding a fourth difference in a background color of each of the plurality of slides in the same group.

4. The document evaluation apparatus according to claim 3, wherein when the processor executes the document evaluation program, the same-group page detecting unit determines that a plurality of tables having the same title are of the same type and determines that the plurality of slides from each of which the same type of table has been detected as the same type of object are in the same group.

5. A document evaluation method comprising:
  determining, via a same-group page detecting unit, that a plurality of slides from each of which the same type of object has been detected are in the same group;
  detecting, via the same-group page detecting unit, the plurality of slides in the same group from a document;
  evaluating, via a consistency evaluation unit, consistency in the plurality of slides, in the same group, that have been detected by the same-group page detecting unit;
  classifying, if a numeric value obtained for evaluating the consistency is equal to or more than a particular value, via an evaluation display unit, the plurality of slides in the same group into a plurality of types according to consistency in the plurality of slides; and
  displaying, via the evaluation display unit, when a difference in a number of slides in each of the plurality of types that is classified is equal to or more than a particular value, an evaluation result obtained by the consistency evaluation unit,
  wherein the evaluating includes evaluating the consistency in the plurality of slides in the same group based on the numeric value that is obtained by at least one of adding a first difference in a position of the same type of object included in each of the plurality of slides in the same group, the position being on each of the plurality of slides, adding a second difference in a size of the same type of object included in each of the plurality of slides in the same group, adding a third difference in a color of the same type of object included in each of the plurality of slides in the same group, and adding a fourth difference in a background color of each of the plurality of slides in the same group.

6. The document evaluation method according to claim 5, comprising: determining, via the same-group page detecting unit, that a plurality of tables having the same title are of the same type; and
  determining, via the same-group page detecting unit, that the plurality of slides from each of which the same type of table has been detected as the same type of object are in the same group.

* * * * *